(12) United States Patent
Slane et al.

(10) Patent No.: US 10,703,481 B2
(45) Date of Patent: Jul. 7, 2020

(54) CONFORMABLE TANK WITH SANDWICH STRUCTURE WALLS

(71) Applicant: Goodrich Corporation, Charlotte, NC (US)

(72) Inventors: Casey Slane, Richwood, OH (US); Nathaniel Ching, Hartville, OH (US); Jin Hu, Hudson, OH (US); Galdemir Cezar Botura, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/689,570

(22) Filed: Aug. 29, 2017

(65) Prior Publication Data

US 2019/0061947 A1 Feb. 28, 2019

(51) Int. Cl.
*B64D 11/00* (2006.01)
*E03B 11/00* (2006.01)
*B64D 37/04* (2006.01)
*B64D 37/06* (2006.01)

(52) U.S. Cl.
CPC .......... *B64D 11/00* (2013.01); *B64D 11/0007* (2013.01); *B64D 37/04* (2013.01); *B64D 37/06* (2013.01); *E03B 11/00* (2013.01)

(58) Field of Classification Search
CPC .... B64D 11/00; B64D 11/0007; B64D 37/04; B64D 37/06; E03B 11/00
USPC .................................................. 220/563, 564
See application file for complete search history.

(56) References Cited

U.S. PATENT DOCUMENTS

| 1,640,471 | A | * | 8/1927 | Staley | B60P 3/221 |
| | | | | | 220/653 |
| 2,461,096 | A | * | 2/1949 | Wagner | B64D 37/06 |
| | | | | | 220/560.02 |
| 2,516,100 | A | * | 7/1950 | Boardman | B23K 5/006 |
| | | | | | 220/565 |
| 2,533,431 | A | * | 12/1950 | Chausson | B64D 37/02 |
| | | | | | 220/563 |
| 2,552,119 | A | | 5/1951 | Scharenberg | |
| 2,634,019 | A | * | 4/1953 | Pfaff | C10K 1/22 |
| | | | | | 220/653 |
| 2,672,254 | A | | 3/1954 | Boardman | |

(Continued)

FOREIGN PATENT DOCUMENTS

CN 103538817 A 1/2014
DE 3206430 A1 9/1983

(Continued)

OTHER PUBLICATIONS

Extended European Search Report for European Patent Application No. 18190532.4, dated Jan. 25, 2019, 7 pages.

(Continued)

*Primary Examiner* — William M McCalister
(74) *Attorney, Agent, or Firm* — Kinney & Lange, P.A.

(57) ABSTRACT

A conformable tank includes a body with a plurality of composite walls formed around a cavity, and an internal support connected to one of the plurality of composite walls and positioned in the cavity. The plurality of composite walls includes a flat side wall disposed opposite a curved side wall. A first section of one of the plurality of composite walls includes an exterior facing, an interior facing, and a core positioned between the exterior facing and the interior facing.

15 Claims, 11 Drawing Sheets

(56) References Cited

U.S. PATENT DOCUMENTS

| | | | | |
|---|---|---|---|---|
| 2,947,439 | A * | 8/1960 | McGrath | F17C 1/02 220/565 |
| 3,288,186 | A * | 11/1966 | Headrick | B64D 37/08 220/563 |
| 3,314,567 | A * | 4/1967 | Becker | B63B 25/12 220/560.07 |
| 3,447,768 | A | 6/1969 | McQueen | |
| 3,931,907 | A * | 1/1976 | Henle | B65D 88/62 220/530 |
| 4,287,913 | A * | 9/1981 | Bennett | B64D 37/22 137/43 |
| 4,432,515 | A * | 2/1984 | Jarvineva | B64D 37/06 244/123.5 |
| 4,858,778 | A * | 8/1989 | Patrick | B64D 37/04 220/562 |
| 4,941,583 | A * | 7/1990 | Gerhard | B65D 88/128 220/653 |
| 4,946,056 | A | 8/1990 | Stannard | |
| 5,042,751 | A | 8/1991 | Kolom | |
| 5,071,166 | A * | 12/1991 | Marino | B65D 90/24 220/560.03 |
| 5,083,727 | A * | 1/1992 | Pompei | B64D 11/0007 105/345 |
| 5,085,343 | A | 2/1992 | Scarr | |
| 5,103,996 | A * | 4/1992 | McGarvey | B28B 19/0038 220/484 |
| 5,303,739 | A * | 4/1994 | Ellgoth | B64D 11/00 137/209 |
| 5,310,080 | A | 5/1994 | Figge, Sr. | |
| 5,367,879 | A * | 11/1994 | Doke | F25B 21/02 62/139 |
| 5,383,566 | A * | 1/1995 | Johnson | B29C 53/824 220/562 |
| 5,398,839 | A * | 3/1995 | Kleyn | B60K 15/03177 220/4.14 |
| 5,476,189 | A * | 12/1995 | Duvall | F17C 1/16 220/588 |
| 5,620,111 | A * | 4/1997 | Gehman | B65D 88/12 220/4.12 |
| 5,647,503 | A | 7/1997 | Steele et al. | |
| 5,651,474 | A | 7/1997 | Callaghan et al. | |
| 5,697,511 | A | 12/1997 | Bampton | |
| 5,758,796 | A * | 6/1998 | Nishimura | F17C 1/06 220/590 |
| 5,779,092 | A | 7/1998 | Hehn et al. | |
| 5,845,879 | A | 12/1998 | Jensen | |
| 5,848,720 | A * | 12/1998 | Logan | B60K 15/067 220/563 |
| 5,927,651 | A | 7/1999 | Geders et al. | |
| 5,936,861 | A | 8/1999 | Jang et al. | |
| 5,944,215 | A * | 8/1999 | Orlowski | F16J 12/00 220/501 |
| 6,044,999 | A * | 4/2000 | Kido | B60K 15/03177 137/574 |
| 6,090,465 | A | 7/2000 | Steele et al. | |
| 6,422,514 | B1 | 7/2002 | Clark et al. | |
| 6,668,561 | B1 | 12/2003 | Sheu et al. | |
| 6,691,889 | B1 * | 2/2004 | Falk | B60K 15/03 220/562 |
| 6,837,464 | B1 | 1/2005 | Kirn et al. | |
| 7,195,133 | B1 * | 3/2007 | Cundiff | F17C 1/04 220/589 |
| 7,396,459 | B2 * | 7/2008 | Thorpe | C02F 1/325 210/205 |
| 7,803,241 | B2 * | 9/2010 | Cundiff | F17C 1/04 156/155 |
| 7,810,670 | B2 | 10/2010 | Carter et al. | |
| 8,192,666 | B2 | 6/2012 | Strack et al. | |
| 8,235,242 | B2 * | 8/2012 | Ha | B63B 11/02 220/560.07 |
| 8,794,476 | B2 | 8/2014 | Hausberger et al. | |
| 8,917,809 | B2 | 12/2014 | Nozawa | |
| 8,939,407 | B2 | 1/2015 | Robinson et al. | |
| 9,126,365 | B1 | 9/2015 | Mark et al. | |
| 9,243,751 | B2 | 1/2016 | Clark et al. | |
| 9,458,955 | B2 | 10/2016 | Hammer et al. | |
| 9,470,366 | B2 | 10/2016 | Dullaert et al. | |
| 9,476,546 | B2 | 10/2016 | Croteau et al. | |
| 9,523,466 | B2 | 12/2016 | Nishimoto et al. | |
| 10,081,129 | B1 | 9/2018 | Alvarado et al. | |
| 10,099,427 | B2 | 10/2018 | Mark et al. | |
| 2002/0179610 | A1 | 12/2002 | Fraklin, III et al. | |
| 2003/0044593 | A1 | 3/2003 | Vaidyanathan et al. | |
| 2004/0159663 | A1 * | 8/2004 | Fenton | A62C 3/065 220/563 |
| 2004/0173618 | A1 * | 9/2004 | Suzuki | F17C 1/16 220/581 |
| 2004/0178205 | A1 * | 9/2004 | Balzer | B60K 15/03177 220/563 |
| 2005/0129889 | A1 | 6/2005 | Davis et al. | |
| 2007/0158343 | A1 | 7/2007 | Shimada et al. | |
| 2007/0289451 | A1 * | 12/2007 | Rice | F24H 1/182 99/275 |
| 2008/0110900 | A1 * | 5/2008 | Veenendaal | B65D 77/0426 220/564 |
| 2009/0174709 | A1 | 7/2009 | Kozlak et al. | |
| 2009/0314785 | A1 | 12/2009 | Cronin et al. | |
| 2010/0084030 | A1 | 4/2010 | Mackulin et al. | |
| 2010/0116778 | A1 | 5/2010 | Melrose | |
| 2011/0168728 | A1 * | 7/2011 | McDermott | B65D 88/10 220/653 |
| 2012/0217249 | A1 * | 8/2012 | Baika | B60K 15/03006 220/501 |
| 2013/0048646 | A1 | 2/2013 | Kataoka et al. | |
| 2013/0213973 | A1 * | 8/2013 | Esser | B29C 65/609 220/563 |
| 2014/0291331 | A1 | 10/2014 | Morales et al. | |
| 2014/0328964 | A1 | 11/2014 | Mark et al. | |
| 2015/0258740 | A1 | 9/2015 | Kang et al. | |
| 2016/0061381 | A1 * | 3/2016 | Kotliar | B23K 15/0086 138/39 |
| 2016/0068235 | A1 | 3/2016 | Ohtsuka et al. | |
| 2016/0070254 | A1 | 3/2016 | Hovsepian et al. | |
| 2016/0161057 | A1 * | 6/2016 | Kang | F17C 1/02 220/581 |
| 2016/0238193 | A1 | 8/2016 | Meyer | |
| 2016/0257403 | A1 * | 9/2016 | Masuda | B29D 22/003 |
| 2016/0263832 | A1 | 9/2016 | Bui et al. | |
| 2016/0272413 | A1 | 9/2016 | Masuda | |
| 2016/0281926 | A1 * | 9/2016 | Croteau | F17C 1/14 |
| 2016/0290564 | A1 * | 10/2016 | Croteau | F17C 1/14 |
| 2016/0341359 | A1 * | 11/2016 | Nishibu | B29C 53/605 |
| 2016/0361869 | A1 | 12/2016 | Mark et al. | |
| 2017/0268206 | A1 * | 9/2017 | Giamati | E03B 11/02 |
| 2018/0126667 | A1 | 5/2018 | Wilenski et al. | |
| 2019/0061948 | A1 | 2/2019 | Ching et al. | |
| 2019/0061986 | A1 | 2/2019 | Slane et al. | |

FOREIGN PATENT DOCUMENTS

| | | |
|---|---|---|
| DE | 102007018549 A1 | 10/2008 |
| DE | 102011101471 A1 | 11/2012 |
| EP | 1409917 B1 | 6/2006 |
| EP | 2392395 A1 | 12/2011 |
| EP | 2942285 A1 | 11/2015 |
| EP | 3015721 A1 | 5/2016 |
| EP | 3061709 A1 | 8/2016 |
| EP | 3073174 A1 | 9/2016 |
| FR | 2218529 A1 | 9/1974 |
| GB | 1426414 | 2/1976 |
| JP | 2005155776 A | 6/2005 |
| KR | 20100113865 A | 10/2010 |
| WO | WO2016057024 A1 | 4/2016 |
| WO | WO2017091222 A1 | 6/2017 |

OTHER PUBLICATIONS

Extended European Search Report for European Patent Application No. 18190579.5, dated Jan. 29, 2019, 10 pages.

(56) References Cited

OTHER PUBLICATIONS

Extended European Search Report for European Patent Application No. 18191294.0, dated Jan. 31, 2019, 5 pages.
Extended European Search Report for European Patent Application No. 18193814.3, dated Feb. 12, 2019, 8 pages.
Extended European Search Report for European Patent Application No. 18194813.4, dated Jun. 26, 2019, 11 pages.
Extended European Search Report for European Patent Application No. 18194813.4 dated Mar. 8, 2019, 12 pages.
European Office Action dated Nov. 8, 2019, received for corresponding European Application No. 18190532.4, 4 pages.
European Office Action dated Mar. 13, 2020, received for corresponding European Application No. 18190579.5, 4 pages.

* cited by examiner

CONFORMABLE TANK WITH SANDWICH STRUCTURE WALLS

BACKGROUND

The present invention relates generally to pressurized tanks, and more particularly to pressurized tanks used on an aircraft for potable water.

The aircraft industry currently employs pressurized tanks constructed of dense metal alloys to transport and make use of potable water on board an aircraft. Potable water on an aircraft may be used for direct human consumption, food preparation, hygienic activities, and sanitation. For example, water may be used for the preparation of hot and cold beverages for consumption, reconstituting dehydrated foods, ingestion from cold water taps or water fountains, brushing of teeth, hand washing, cleaning of utensils, lavatory use, and onboard showering facilities.

In general, any tank for use in an aircraft is subjected to pressure, vibration, flight loads, and shock stresses. The pressure, in particular, can create large bending stresses on flat walls of the tanks. Metal tanks have internal bracing to support various sections and joints that are under such stresses, especially those portions with flat walls and sharp corners. However, metal tanks are relatively heavy. The higher the total weight of an aircraft the more fuel that is required to fly. Thus, it is desirable to find a lightweight conformable tank which can withstand the pressure, vibration, flight loads, and shock stresses encountered on board an aircraft to improve its fuel efficiency.

SUMMARY

A conformable tank includes a body with a plurality of composite walls formed around a cavity, and an internal support connected to one of the plurality of composite walls and positioned in the cavity. The plurality of composite walls includes a flat side wall disposed opposite a curved side wall. A first section of one of the plurality of composite walls includes an exterior facing, an interior facing, and a core positioned between the exterior facing and the interior facing.

A potable water system for an aircraft includes a conformable tank positioned adjacent to a fuselage of the aircraft that is configured to hold potable water, a fluid flow inducer connected to the conformable tank that is configured to pump water through the potable water system, and a control valve connected to the fluid flow inducer and the conformable tank that is configured to control the flow of water. The conformable tank includes a body with a plurality of composite walls formed around a cavity, and an internal support connected to one of the plurality of composite walls and positioned in the cavity. A first section of one of the plurality of composite walls includes an exterior facing, an interior facing, and a core positioned between the exterior facing and the interior facing.

DETAILED DESCRIPTION

Figure 1A:
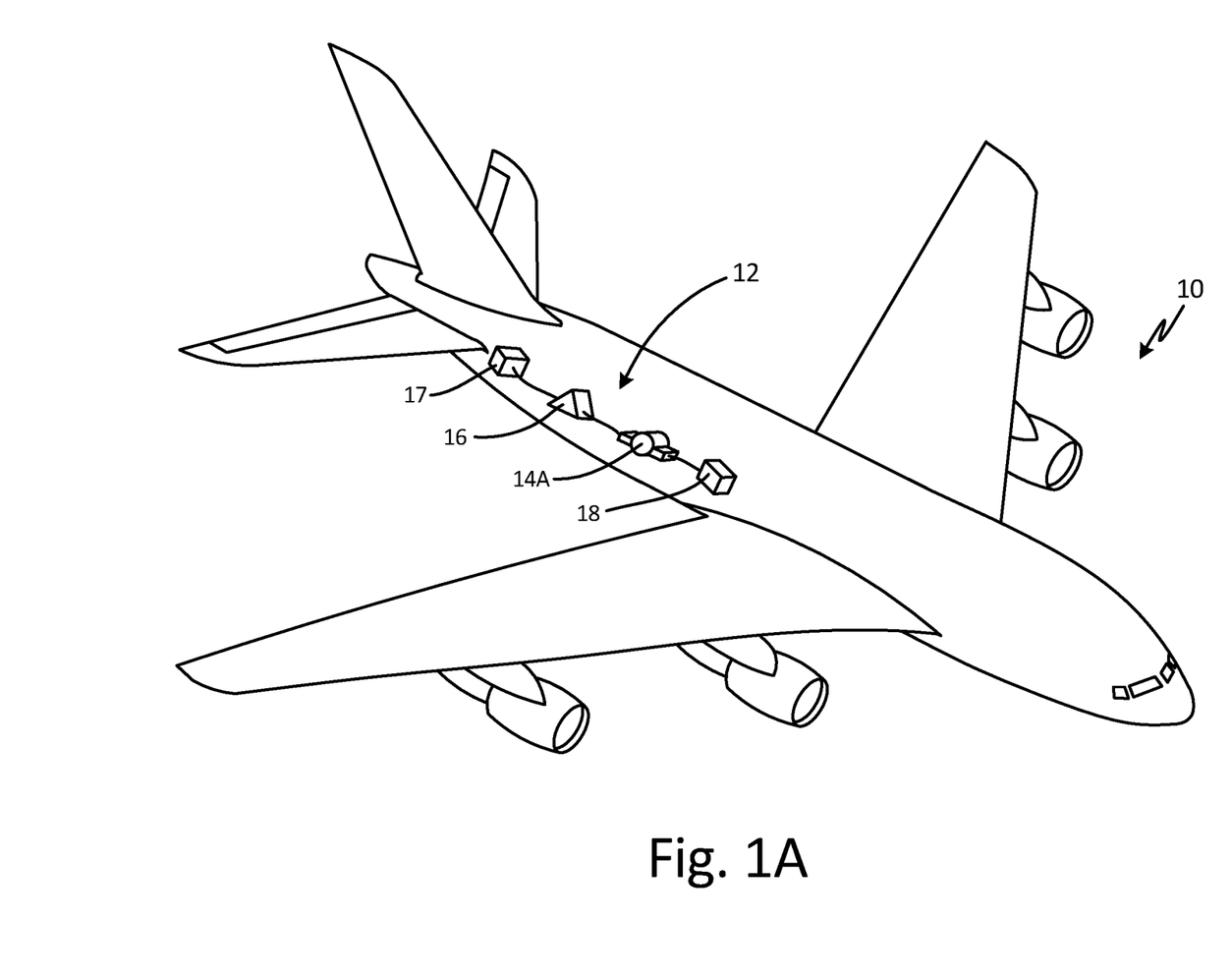
FIG. 1A is a schematic of an aircraft with a first embodiment of a potable water system.
Figure 1B:
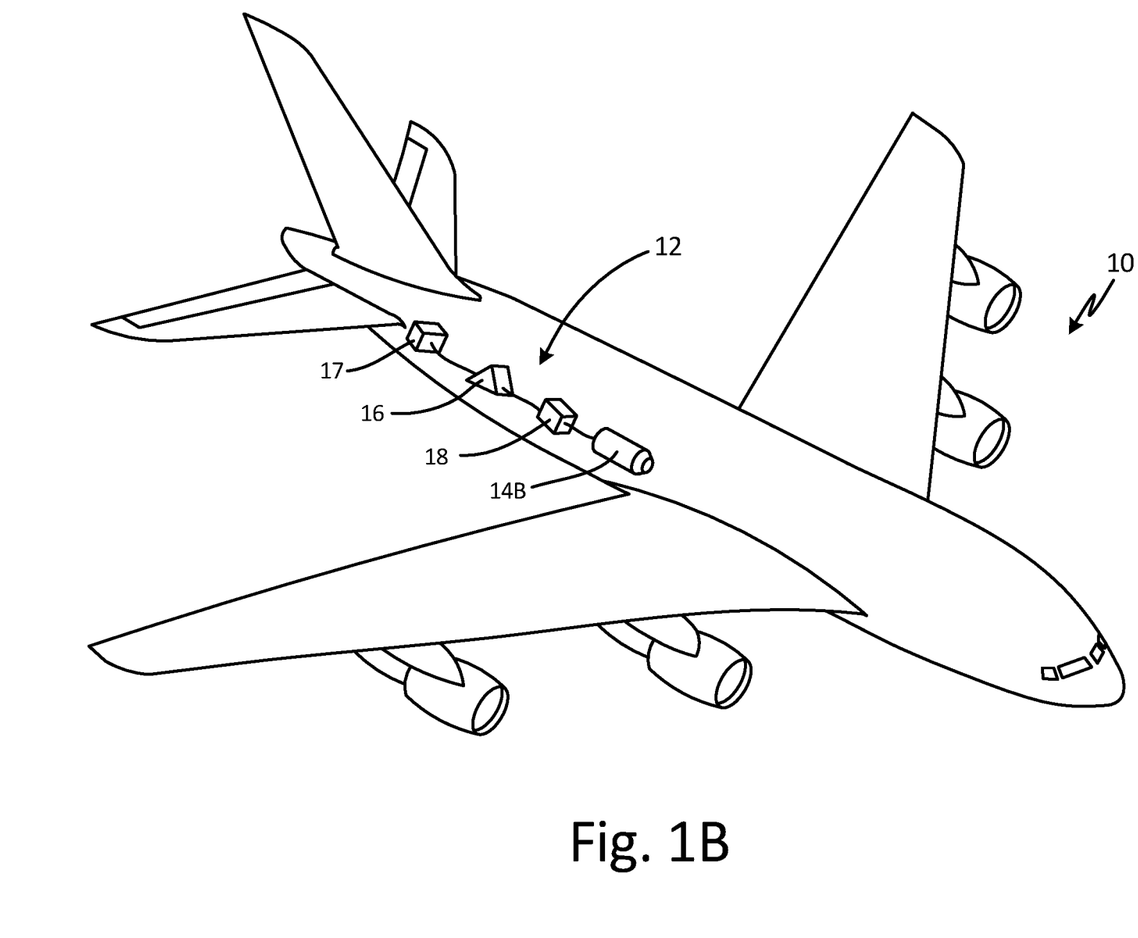
FIG. 1B is a schematic of an aircraft with a second embodiment of a potable water system.
Figure 1C:
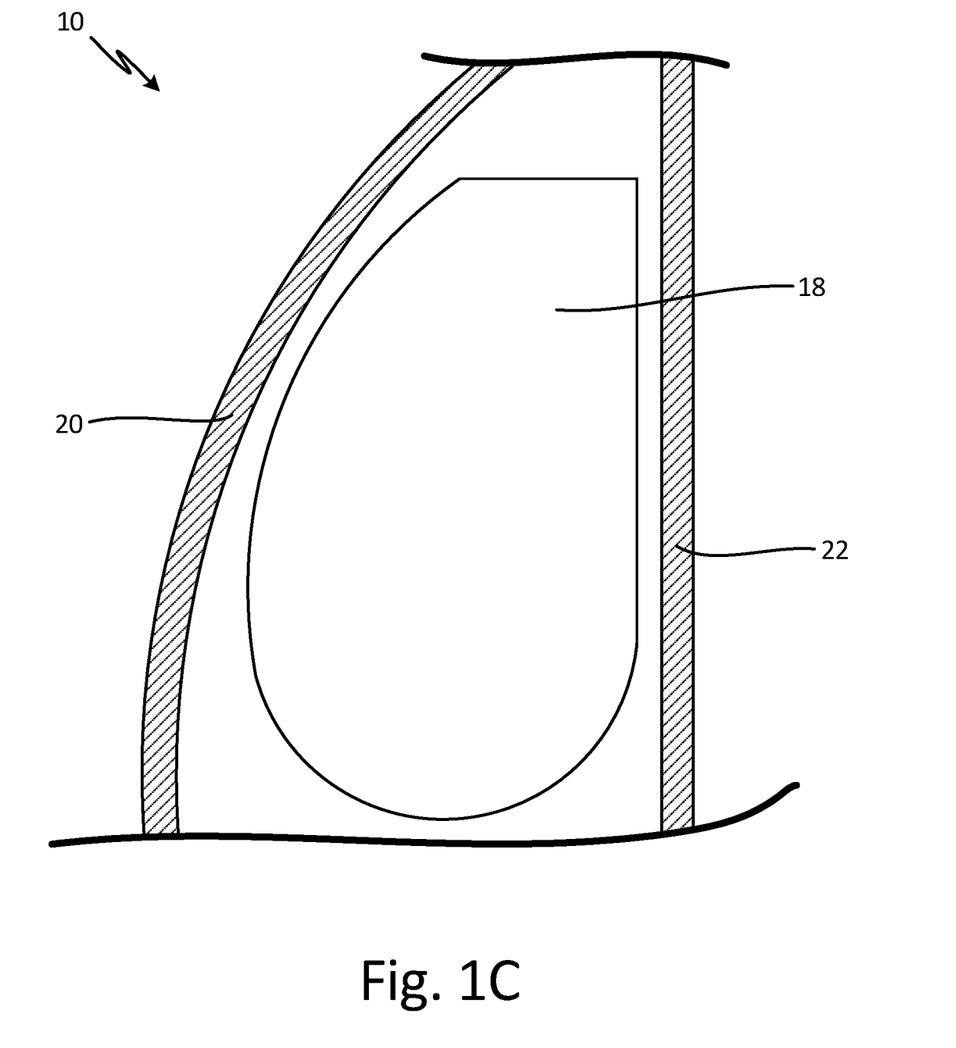
FIG. 1C is a cross-sectional view of an aircraft fuselage, showing a conformable tank.

FIG. 1A is a schematic of aircraft 10 with a first embodiment of potable water system 12, which includes hydraulic pump 14A, control valve 16, point of use 17, and conformable tank 18. FIG. 1B is a schematic of aircraft 10 with a second embodiment of potable water system 12, which includes compressed air source 14B, control valve 16, point of use 17, and conformable tank 18. FIG. 1C is a cross-sectional view of aircraft 10, showing conformable tank 18, fuselage 20, and internal structure 22.

Situated in an aft portion of aircraft 10 is potable water system 12. In the first embodiment shown in FIG. 1A, potable water system 12 includes hydraulic pump 14A, control valve 16, point of use 17, and conformable tank 18 that are connected to one another by hydraulic tubes, lines, or hoses. Fluid flow within potable water system 12 is induced using hydraulic pump 14A. Fluid flow within potable water system 12 is controlled using control valve 16. Potable water for use in potable water system 12 is stored in conformable tank 18. In the embodiment shown in FIG. 1B, potable water system 12 includes compressed air source 14B, control valve 16, point of use 17, and conformable tank 18 that are connected to one another by hydraulic tubes, lines, or hoses. Fluid flow within potable water system 12 is induced by compressed air source 14B. Fluid flow within potable water system 12 is controlled using control valve 16. Potable water for use in potable water system 12 is stored in conformable tank 18 at an elevated pressure, as compared to ambient pressure outside conformable tank 18.

As shown in FIG. 1C, conformable tank 18 is configured to conform to both fuselage 20 and internal structure 22. A curved wall on a first side of conformable tank 18 is configured to conform to the curvature of fuselage 20. Likewise, a flat wall on a second side of conformable tank 18 opposite of the curved wall is configured to conform to internal structure 22. FIG. 1C shows one embodiment of conformable tank 18 and is not meant to limit the disclosure to a single embodiment. Conformable tank 18 is conformable for use in a plurality of irregular aircraft spaces. The following description details two possible embodiments of conformable tank 18.

Figure 2:
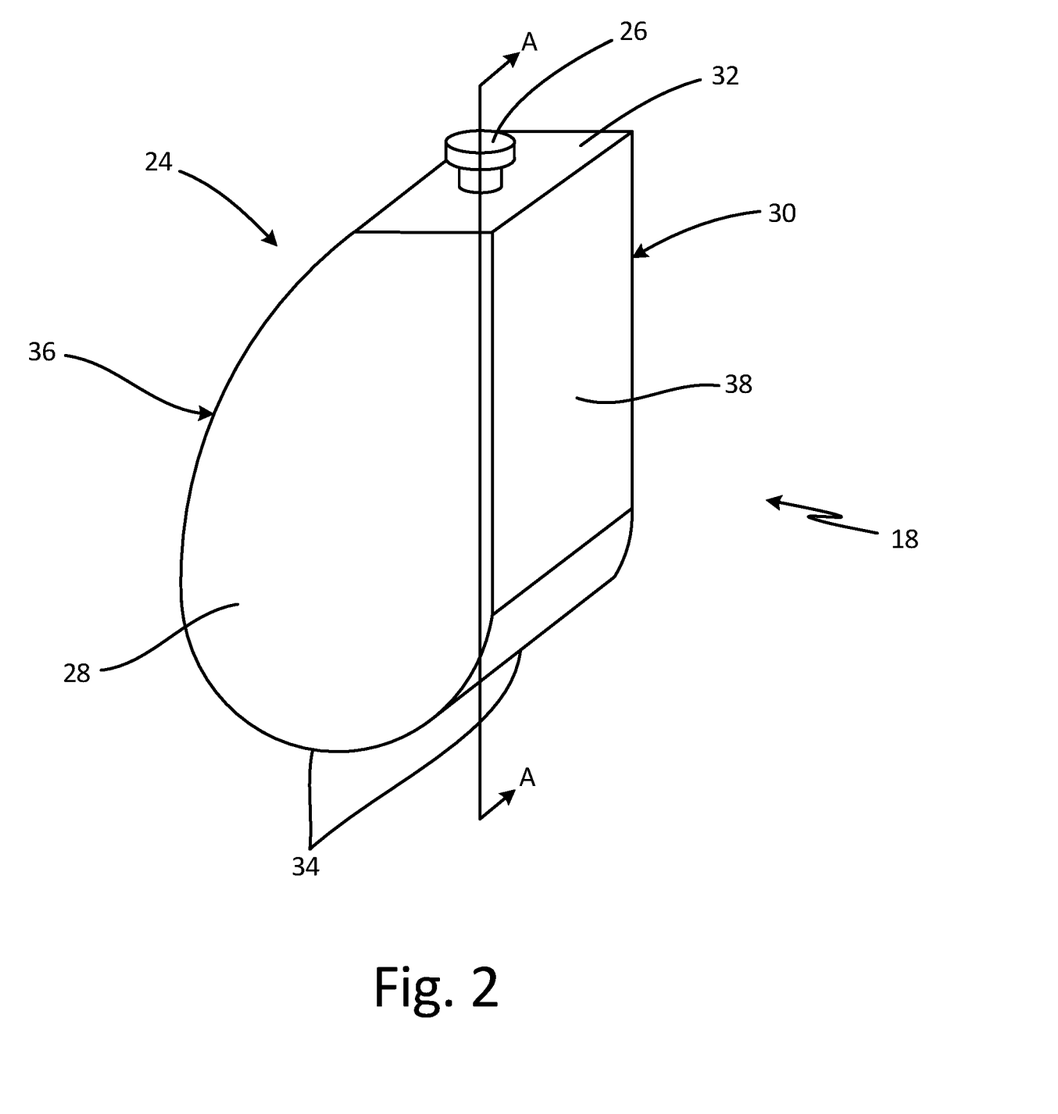
FIG. 2 is a perspective view of the conformable tank of FIG. 1B.

FIG. 2 is a perspective view of conformable tank 18. Conformable tank 18 includes body 24 and port 26. Body 24 includes front wall 28, rear wall 30, top wall 32, bottom wall 34, curved side wall 36, and flat side wall 38. In the embodiment shown in FIG. 2, front wall 28, rear wall 30, and top wall 32 are shown as flat walls and bottom wall 34 is shown as a curved wall. In alternate embodiments, front wall 28, rear wall 30, top wall 32 and bottom wall 34 can be flat walls, curved walls, or irregular shaped walls.

Conformable tank 18 is made out of a continuous fiber filament reinforced composite that is produced using a fused deposition modeling process in the embodiment shown in FIG. 2. In alternate embodiments, conformable tank 18 can be manufactured out of any suitable material using any suitable process. Conformable tank 18 includes body 24 that forms a housing for conformable tank 18. A fluid can be stored in body 24 of conformable tank 18. Port 26 extends through body 24 of conformable tank 18. Port 26 is an inlet/outlet for conformable tank 18 that allows a fluid to flow into and out of conformable tank 18. As conformable tank 18 is a pressurized tank, port 26 is used to allow the fluid to flow into and out of conformable tank 18 while maintaining the pressure in conformable tank 18. In alternate embodiments, other mechanisms can be used to allow the fluid to flow into and out of conformable tank 18.

Body 24 of conformable tank 18 includes front wall 28 that is positioned opposite of rear wall 30, top wall 32 that is positioned opposite of bottom wall 34, and curved side wall 36 that is positioned opposite of flat side wall 38. Front wall 28 is in contact with and connects to top wall 32, bottom wall 34, curved side wall 36, and flat side wall 38. Rear wall 30 is in contact with and connects to top wall 32, bottom wall 34, curved side wall 36, and flat side wall 38. Top wall 32 extends between and connects to front wall 28, rear wall 30, curved side wall 36, and flat side wall 38. Bottom wall 34 extends between and connects to front wall 28, rear wall 30, curved side wall 36, and flat side wall 38. Curved side wall 36 is in contact with and connects to front wall 28, rear wall 30, top wall 32, and bottom wall 34. Flat side wall 38 is in contact with and connects to front wall 28, rear wall 30, top wall 32, and bottom wall 34.

In the embodiment shown in FIG. 2, port 26 is situated on top wall 32. In alternate embodiments, port 26 can be situated on any of the walls of body 24, such as front wall 28, rear wall 30, top wall 32, bottom wall 34, curved side wall 36, or flat side wall 38. Further, in the embodiment shown in FIG. 2 there is only one port 26. In alternate embodiments, there can be a plurality of port 26, extending through the same wall or different walls of body 24. Port 26 is configured to aid in filling and emptying conformable tank 18. In the embodiment shown in FIG. 2, conformable tank 18 is designed to store potable water for use on aircraft 10 as a part of potable water system 12 (shown in FIG. 1A). Port 26 of conformable tank 18 can be connected by a tube to hydraulic pump 14A of potable water system 12, as shown in FIG. 1A. Likewise, port 26 of conformable tank 18 can be connected by a tube to compressed air source 14B and control valve 16 of potable water system 12, as shown in FIG. 1B.

Figure 3A:
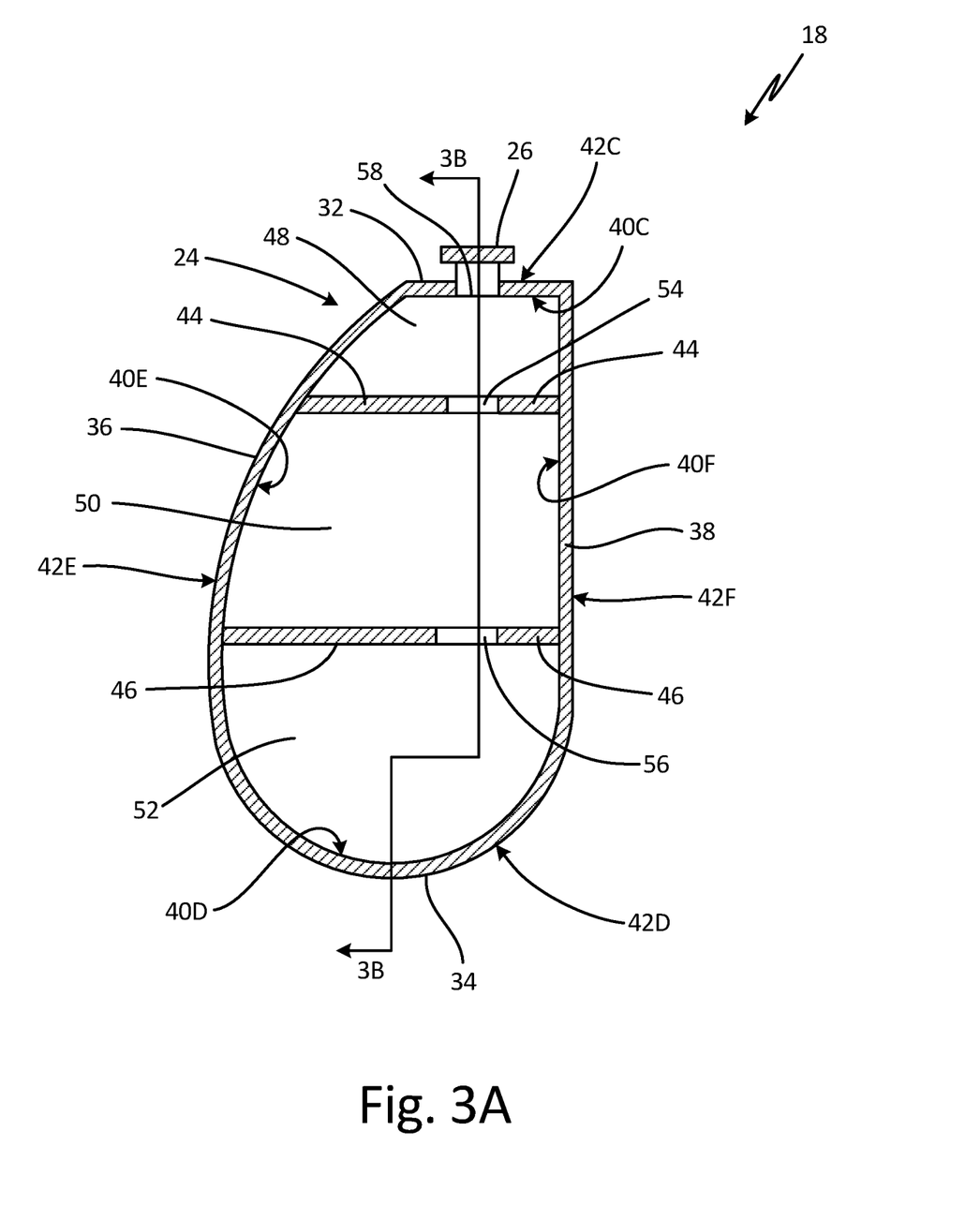
FIG. 3A is a side cross-sectional view of a first embodiment of the conformable tank taken along line A-A of FIG. 2.
Figure 3B:
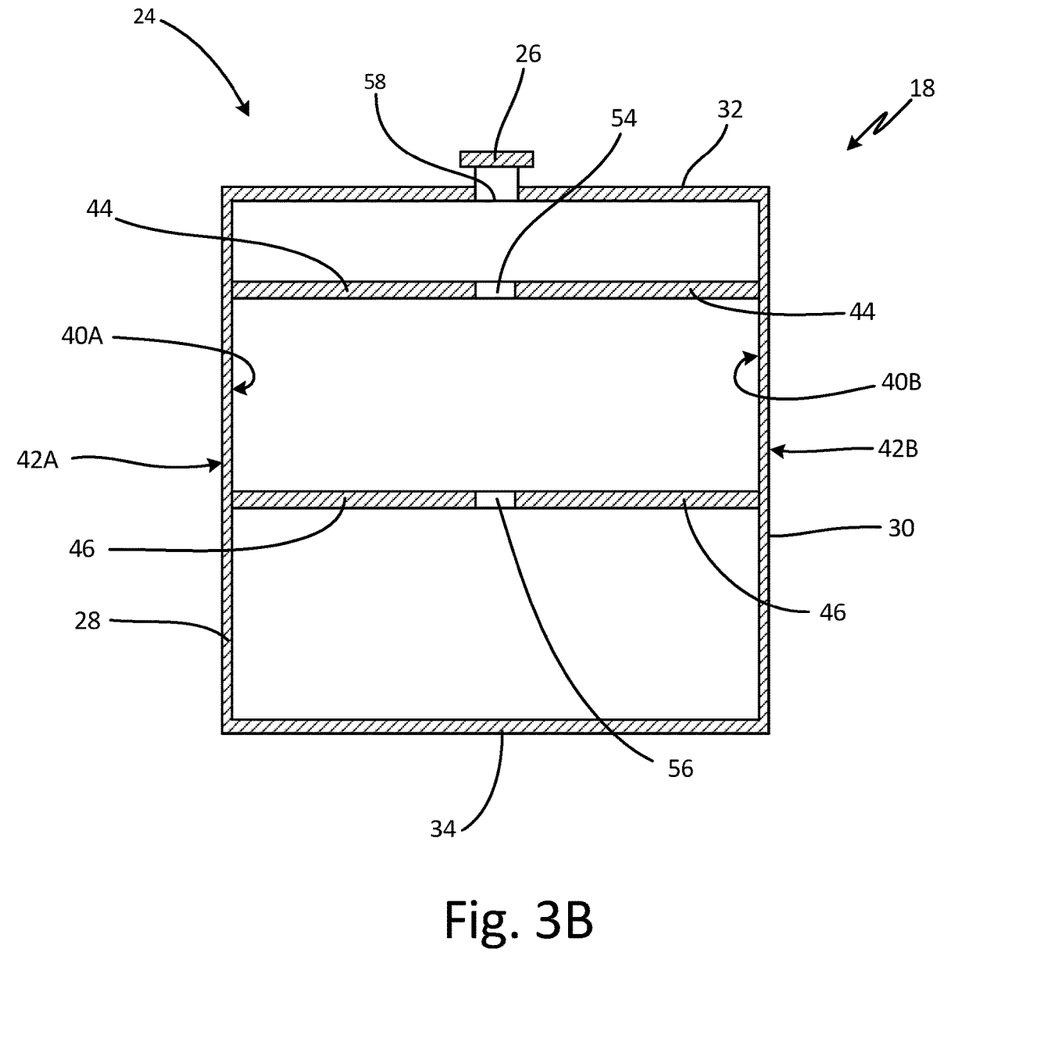
FIG. 3B is a side cross-section view of the first embodiment of the conformable tank taken along line 3B-3B of FIG. 3A.

FIG. 3A is a side cross-sectional view of a first embodiment of conformable tank 18 taken along line A-A of FIG. 2. FIG. 3B is a side cross-section view of the first embodiment of conformable tank 18 taken along line 3B-3B of FIG. 3A. Conformable tank 18 includes body 24 and port 26. Body 24 includes front wall 28, rear wall 30, top wall 32, bottom wall 34, curved side wall 36, and flat side wall 38. Front wall 28, rear wall 30, top wall 32, bottom wall 34, curved side wall 36, and flat side wall 38 include inner surfaces 40A, 40B, 40C, 40D, 40E, and 40F, and outer surfaces 42A, 42B, 42C, 42D, 42E, and 42F, respectively. Conformable tank 18 further includes first baffle 44, second baffle 46, first cavity 48, second cavity 50, third cavity 52, first aperture 54, second aperture 56, and third aperture 58.

Conformable tank 18 includes body 24 that forms a housing of conformable tank 18. Port 26 extends through body 24 of conformable tank 18 to provide an inlet/outlet to conformable tank 18. Body 24 of conformable tank 18 includes front wall 28 that is positioned opposite of rear wall 30, top wall 32 that is positioned opposite of bottom wall 34, and curved side wall 36 that is positioned opposite of flat side wall 38.

Front wall 28 includes inner surface 40A and outer surface 42A. Rear wall 30 includes inner surface 40B and outer surface 42B. Top wall 32 includes inner surface 40C and outer surface 42C. Bottom wall 34 includes inner surface 40D and outer surface 42D. Curved side wall 36 includes inner surface 40E and outer surface 42E. Flat side wall 38 includes inner surface 40F and outer surface 42F. Inner surfaces 40A, 40B, 40C, 40D, 40E, and 40F form an interior of conformable tank 18 and outer surfaces 42A, 42B, 42C, 42D, 42E, and 42F form an exterior of conformable tank 18.

Conformable tank 18 further includes first baffle 44 and second baffle 46 extending through an interior of conformable tank 18. First baffle 44 extends from inner surface 40E of curved side wall 36 to inner surface 40F of flat side wall 38. First baffle 44 also extends from inner surface 40A of front wall 28 to inner surface 40B of rear wall 30. Second baffle 46 extends from inner surface 40E of curved side wall 36 to inner surface 40F of flat side wall 38. Second baffle 46 also extends from inner surface 40A of front wall 28 to inner surface 40B of rear wall 30.

First baffle 44 and second baffle 46 are configured to act as internal supports and provide structural support to body 24 of conformable tank 18. Without first baffle 44 and second baffle 46, conformable tank 18 could deform under internal pressure. In the embodiment shown, conformable tank 18 includes two baffles. In alternate embodiments, conformable tank 18 can include any number of baffles.

First baffle 44 and second baffle 46 divide the interior of conformable tank 18 into first cavity 48, second cavity 50, and third cavity 52. First cavity 48 is defined as the volume enclosed by front wall 28, rear wall 30, top wall 32, curved side wall 36, flat side wall 38, and first baffle 44. Second cavity 50 is defined as the volume enclosed by front wall 28, rear wall 30, curved side wall 36, flat side wall 38, first baffle 44, and second baffle 46. Third cavity 52 is defined as the volume enclosed by front wall 28, rear wall 30, bottom wall 34, curved side wall 36, and flat side wall 38, and second baffle 46. First cavity 48, second cavity 50, and third cavity 52 are configured to store potable water, or any other fluid, at an elevated pressure in conformable tank 18.

Extending through first baffle 44 and fluidly connecting first cavity 48 and second cavity 50 is first aperture 54. Extending through second baffle 46 and fluidly connecting second cavity 50 and third cavity 52 is second aperture 56. The embodiment shown in FIGS. 3A-3B shows a single aperture extending through each baffle. Alternate embodiments may include any number of apertures extending through each baffle. Further, the apertures can be of equal shape and size or varying shape and size.

Extending through top wall 32 is third aperture 58. Third aperture 58 provides a means for filling and emptying conformable tank 18. Third aperture 58 can be fitted with port 26 or any other component used to aid in filling and emptying conformable tank 18. According to the embodiment shown in FIGS. 3A-3B, third aperture 58 extends through top wall 32. In alternate embodiments, third aperture 58 can extend through any of the walls of body 24, such as front wall 28, rear wall 30, top wall 32, bottom wall 34, curved side wall 36, or flat side wall 38.

Conformable tank 18 is configured to store fluids, particularly potable water, at an elevated pressure when compared to ambient pressure outside conformable tank 18. The baffles within conformable tank 18 provide structural support to prevent excessive deformation from the internal pressure while still allowing fluid to pass from cavity to cavity. Conformable tank 18 can be designed to fit in and conform to a plurality of irregular aircraft spaces.

Figure 4A:
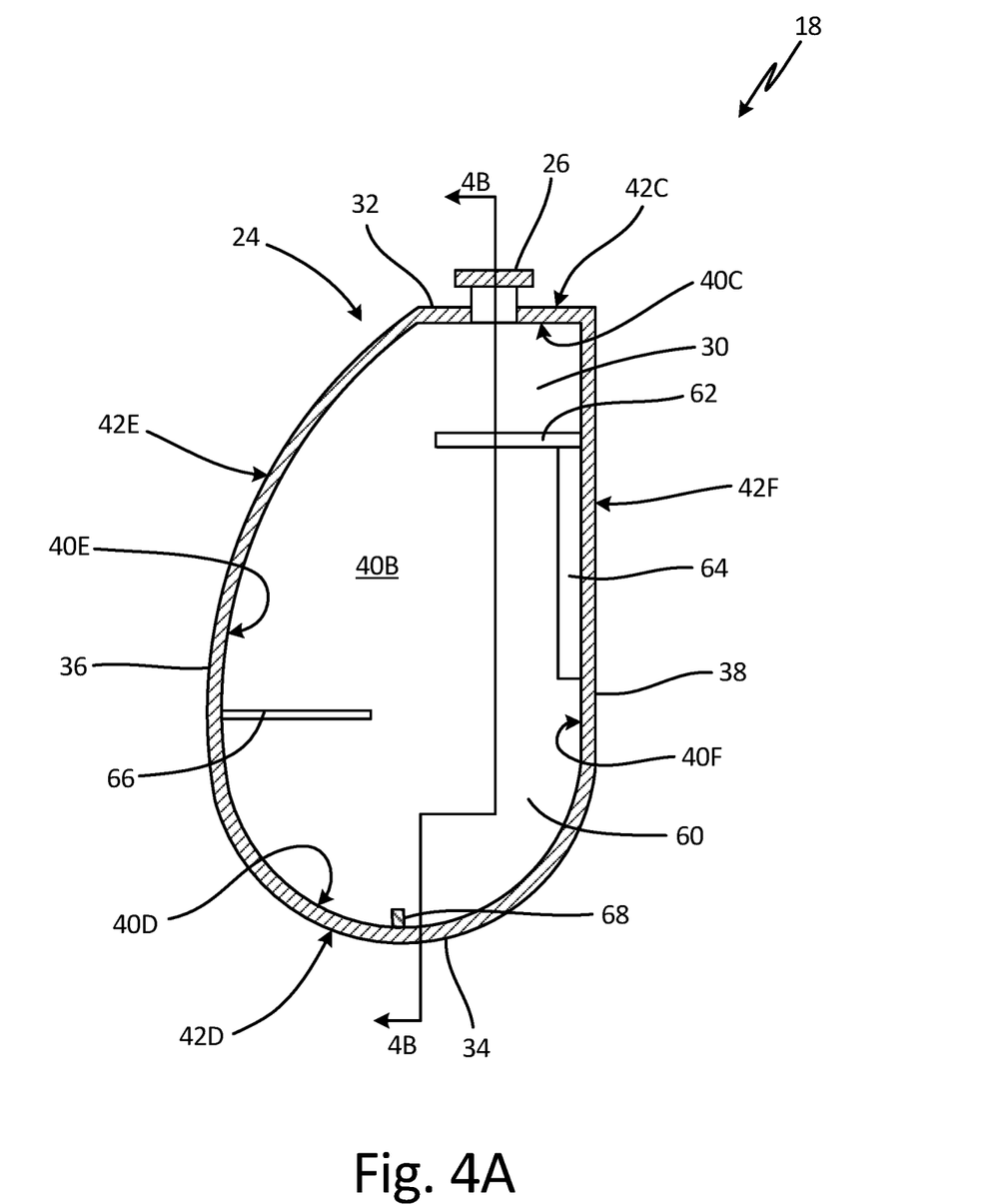
FIG. 4A is a side cross-sectional view of a second embodiment of the conformable tank taken along line A-A of FIG. 2.
Figure 4B:
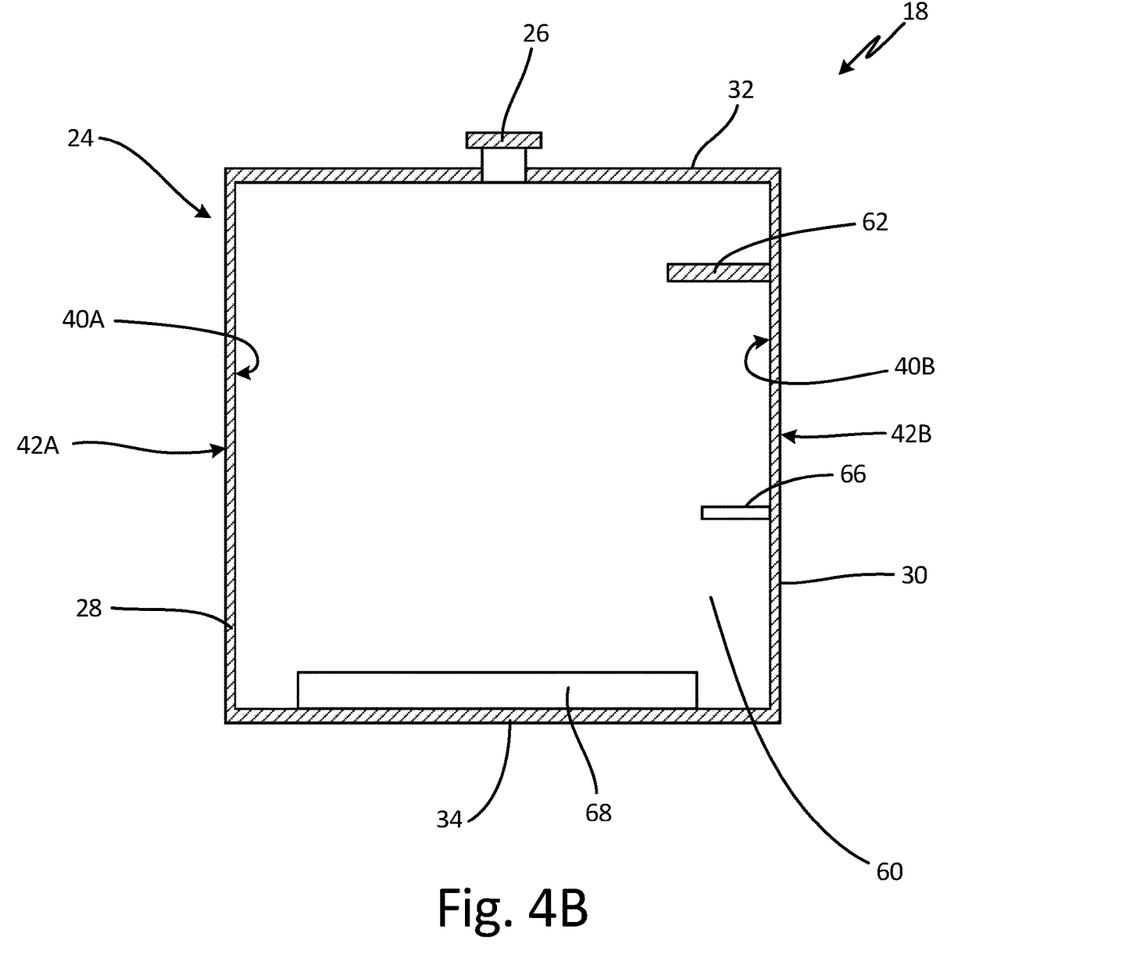
FIG. 4B is a side cross-sectional view of the second embodiment of the conformable tank taken along line 4B-4B of FIG. 4A.

FIG. 4A is a side cross-sectional view of a second embodiment of conformable tank 18 taken along line A-A of FIG. 2. FIG. 4B is a side cross-sectional view of the second embodiment of conformable tank 18 taken along line 4B-4B of FIG. 4A. Conformable tank 18 includes body 24 and port 26. Body 24 includes front wall 28, rear wall 30, top wall 32, bottom wall 34, curved side wall 36, and flat side wall 38. Front wall 28, rear wall 30, top wall 32, bottom wall 34, curved side wall 36, and flat side wall 38 include inner surfaces 40A, 40B, 40C, 40D, 40E, and 40F, and outer surfaces 42A, 42B, 42C, 42D, 42E, and 42F, respectively. Conformable tank 18 further includes internal cavity 60, first rib 62, second rib 64, third rib 66, and fourth rib 68.

Conformable tank 18 includes body 24 that forms a housing of conformable tank 18. Port 26 extends through body 24 of conformable tank 18 to provide an inlet/outlet to conformable tank 18. Body 24 of conformable tank 18 includes front wall 28 that is positioned opposite of rear wall 30, top wall 32 that is positioned opposite of bottom wall 34, and curved side wall 36 that is positioned opposite of flat side wall 38.

Front wall 28 includes inner surface 40A and outer surface 42A. Rear wall 30 includes inner surface 40B and outer surface 42B. Top wall 32 includes inner surface 40C and outer surface 42C. Bottom wall 34 includes inner surface 40D and outer surface 42D. Curved side wall 36 includes inner surface 40E and outer surface 42E. Flat side wall 38 includes inner surface 40F and outer surface 42F. Inner surfaces 40A, 40B, 40C, 40D, 40E, and 40F form an interior of conformable tank 18 and outer surfaces 42A, 42B, 42C, 42D, 42E, and 42F form an exterior of conformable tank 18. Internal cavity 60 is formed in the interior of conformable tank 18.

Conformable tank 18 includes first rib 62, second rib 64, third rib 66, and fourth rib 68 in cavity 60 to provide structural support for conformable tank 18. First rib 62 extends along inner surface 40B of rear wall 30 and abuts inner surface 40F of flat side wall 38 and protrudes into internal cavity 60. Second rib 64 extends along inner surface 40F of flat side wall 38 and protrudes into internal cavity 60. Third rib 66 extends along inner surface 40B of rear wall 30 and protrudes into internal cavity 60. Fourth rib 68 extends from inner surface 40D of bottom wall 34 and protrudes into internal cavity 60.

The embodiment shown in FIGS. 4A-4B is one embodiment of conformable tank 18 with ribs utilized as internal supports. The ribs provide structural support to conformable tank 18 and prevent it from deforming excessively under internal pressure. This embodiment is not meant to limit the disclosure to a single embodiment. In alternate embodiments, conformable tank 18 can include a plurality of ribs of varying shapes and sizes. The ribs can connect to any of the walls of body 24 and extend along or protrude from the walls in any suitable manner.

Conformable tank 18 is configured to store fluids, particularly potable water, at an elevated pressure when compared to ambient pressure outside conformable tank 18. The ribs within conformable tank 18 provide structural support to prevent excessive deformation from the internal pressure while still allowing fluid flow within the internal cavity. Conformable tank 18 can be designed to fit in and conform to a plurality of irregular aircraft spaces.

Figure 5:
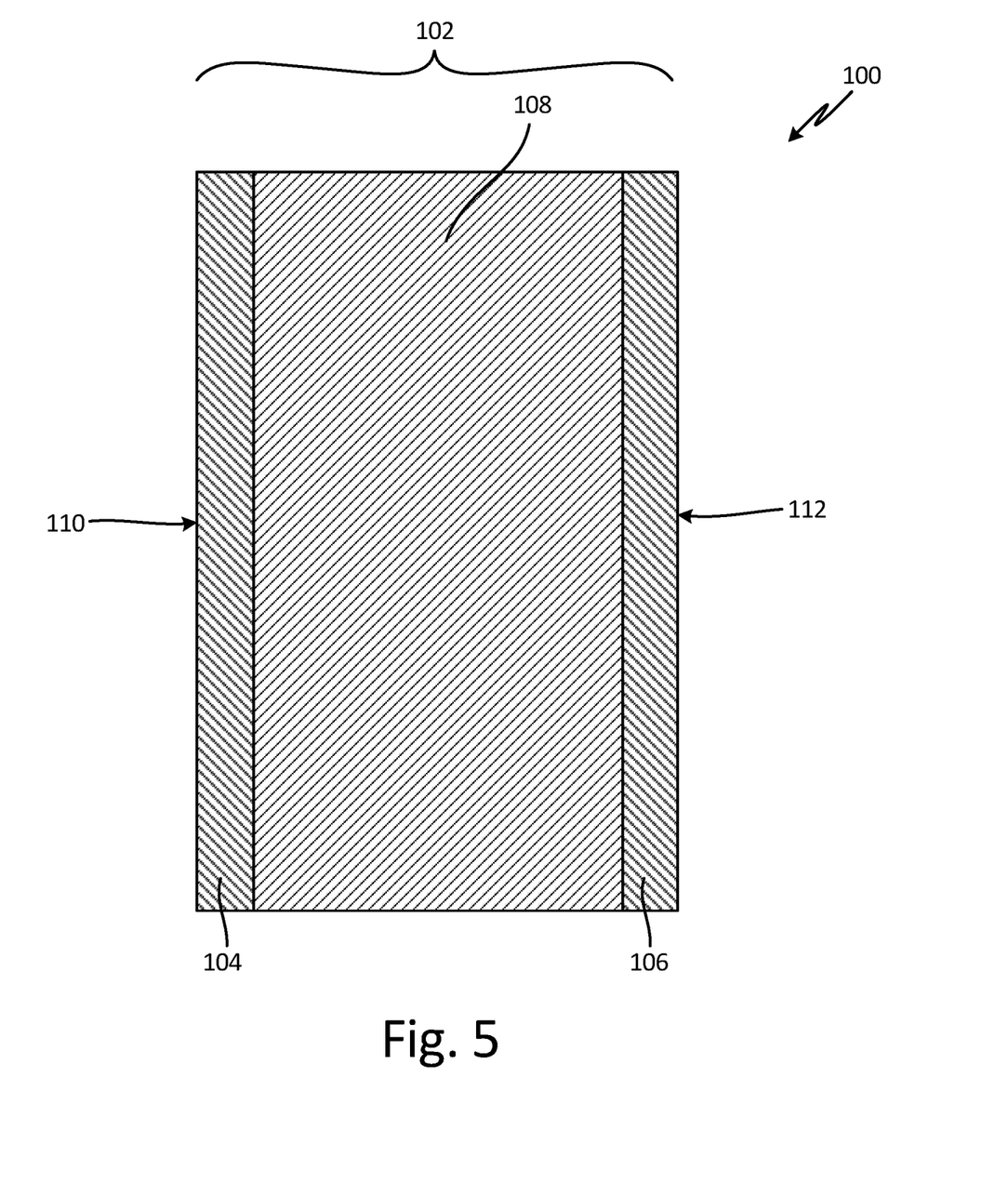
FIG. 5 is a cross-sectional view of a tank wall including a sandwich structure.

FIG. 5 is a cross-sectional view of tank wall 100 including sandwich structure 102. Sandwich structure 102 includes interior facing 104, exterior facing 106, and core 108. Interior facing 104 includes inner surface 110, and exterior facing 106 includes outer surface 112.

Tank wall 100 can be any of front wall 28, rear wall 30, top wall 32, bottom wall 34, curved side wall 36, and flat side wall 38, as discussed in reference to FIGS. 2-4B. Tank wall 100 includes sandwich structure 102. Sandwich structure 102 is constructed with interior facing 104 separated from exterior facing 106 by core 108. Interior facing 104 and exterior facing 106 are a composite material such as thermoplastic, fiberglass, carbon fiber reinforced plastic, synthetic fibers (such as Kevlar® or aramid fibers), or any combination thereof. Core 108 is displaced between and physically contacts interior facing 104 and exterior facing 106. Core 108 may be made of composite honeycomb, foam, like material or any combination thereof. When core 108 includes composite honeycomb, the composite honeycomb may be made of thermoplastic, fiberglass, carbon materials, synthetic fibers (such as Kevlar® or aramid fibers), like material, or any combination thereof. The cell size, density, and shape of the honeycomb or foam of core 108 can also vary in order to meet tank design specifications. Interior facing 104 forms inner surface 110 of tank wall 100, inner surface 110 being positioned to face an interior of conformable tank 18. Exterior facing 106 forms outer surface 112 of tank wall 100, outer surface 112 being positioned to face an exterior of conformable tank 18. Interior surface 110 and exterior surface 112 may be covered with non-structural materials to prevent water leakage, as a chemical barrier, for aesthetics, for thermal insulation, or for electrical conductivity.

Core 108 is made of lightweight material that supports interior facing 104 and exterior facing 106. Sandwich structure 102 increases relative stiffness and strength of tank wall 100 without substantially increasing the weight of tank wall 100. This results in conformable tank 18 (shown in FIGS. 1A-4B) that is lightweight relative to a similarly constructed metal tank while still being able to meet the rigorous pressure (e.g. operating pressure, proof pressure, burst pressure), mounting, vibration, flight load, and shock specifications required for an application such as aircraft use. The sandwich structure 102 wall is particularly useful for conformable tank 18 with flat walls and sharp corners where internal pressures can cause large bending stresses.

Figure 6A:
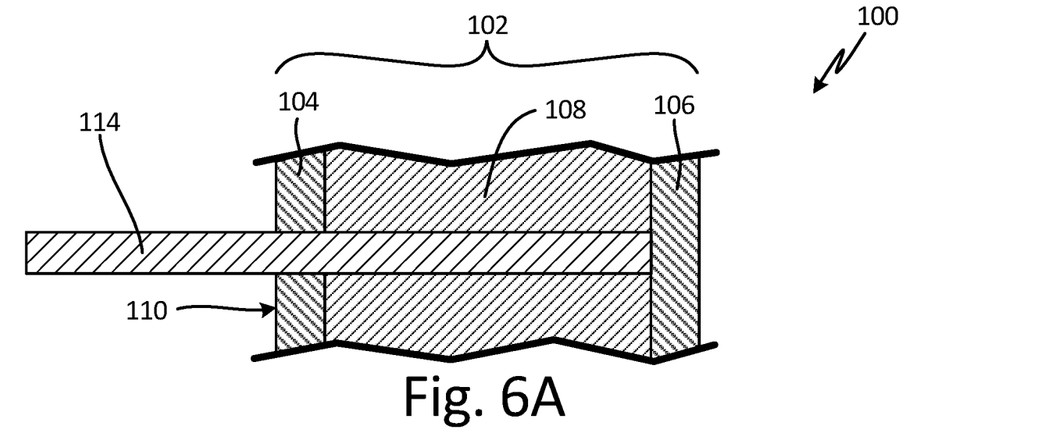
FIG. 6A is a cross-sectional view of a tank wall with an internal support integrally connected to an exterior facing of a sandwich structure.
Figure 6B:
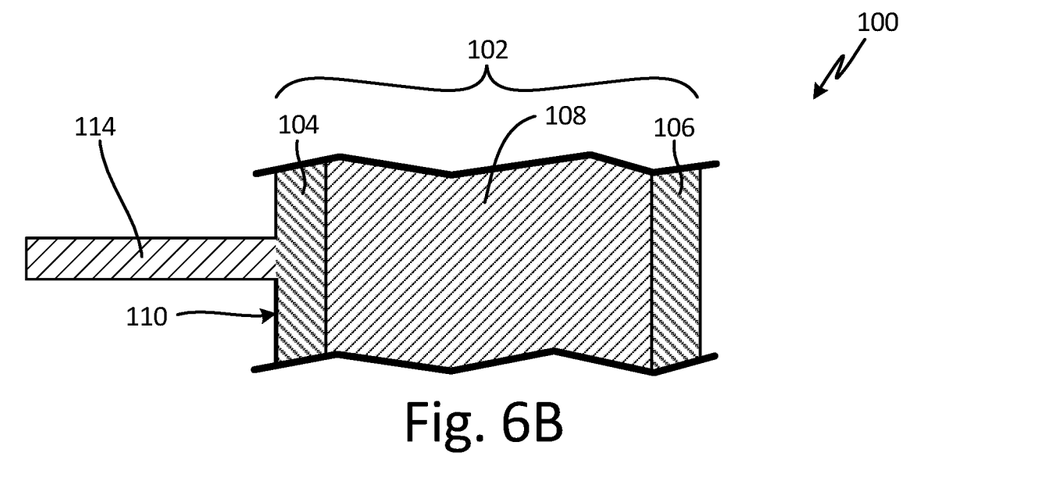
FIG. 6B is a cross-sectional view of a tank wall with an internal support integrally connected to an interior facing of a sandwich structure.
Figure 6C:
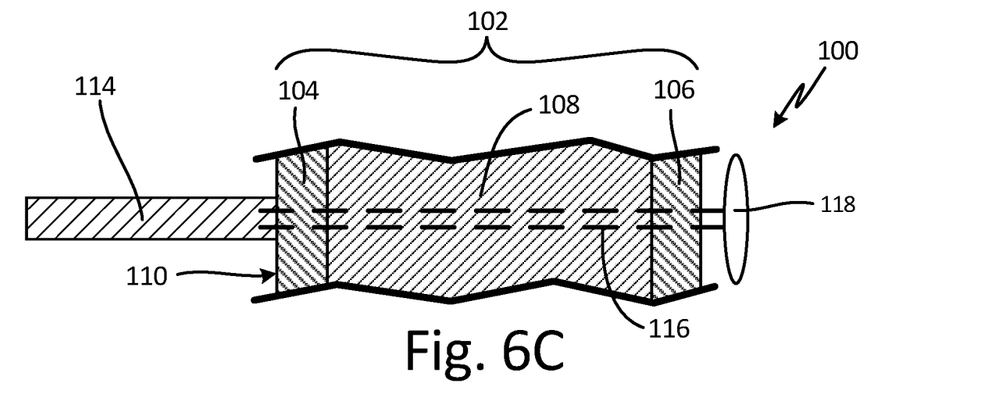
FIG. 6C is a cross-sectional view of a tank wall with an internal support connected to a sandwich structure by a mechanical fastener.

FIG. 6A is a cross-sectional view of tank wall 100 with internal support 114 integrally connected to exterior facing 106 of sandwich structure 102. FIG. 6B is a cross-sectional view of tank wall 100 with internal support 114 integrally connected to interior facing 104 of sandwich structure 102. FIG. 6C is a cross-sectional view of tank wall 100 with internal support 114 integrally connected to sandwich structure 102 by mechanical fastener 116. Tank wall 100 includes sandwich structure 102. Sandwich structure 102 includes interior facing 104, exterior facing 106, and core 108. Interior facing 104 includes inner surface 110, and exterior facing 106 includes outer surface 112. FIGS. 6A-6B further show internal support 114. FIG. 6C also shows mechanical fastener 116. Mechanical fastener 116 includes head 118.

Referring to FIGS. 6A-6C, tank wall 100 is made of sandwich structure 102. Sandwich structure 102 is constructed with interior facing 104 separated from exterior facing 106 by core 108. Interior facing 104 forms inner surface 110 of tank wall 100, inner surface 110 being positioned in an interior of conformable tank 18. Exterior facing 106 forms outer surface 112 of tank wall 100, outer surface 112 being positioned in an exterior of conformable tank 18. Internal support 114 is attached to tank wall 100. Internal support 114 may be a rib (as shown in FIGS. 4A-4B) or a baffle (as shown in FIGS. 3A-3B) consisting of any composite material such as thermoplastic, fiberglass, carbon fiber reinforced plastic, synthetic fibers (such as Kevlar® or aramid fibers), or any combination thereof.

Referring now to FIG. 6A, internal support 114 is attached to tank wall 100 by being integrally connected to exterior facing 106 and extending through interior facing 104 and core 108. One way of integrally connecting internal support 114 to exterior facing 106 is by weaving internal support 114 into exterior facing 106. Weaving, as used herein, means braiding, stitching, sewing, contour weaving, steered weaving, and through thickness weaving.

Referring now to FIG. 6B, internal support 114 may be attached to wall 100 by being integrally connected to interior facing 104. Integrally connecting internal support 114 to interior facing 104 may be accomplished by weaving internal support 114 into interior facing 104.

In another embodiment shown in FIG. 6C, internal support 114 is attached to tank wall 100 by mechanical fastener 116. Mechanical fastener 116 extends through exterior facing 106, core 108, and interior facing 104. Mechanical fastener 116 is attached to internal support 114 and holds internal support 114 in place. Mechanical fastener 116 may be attached to internal support 114 by an embedded nut disposed in internal support 114. Where an embedded nut is used, mechanical fastener 116 is threaded into the embedded nut to connect mechanical fastener 116 to internal support 114. Mechanical fastener 116 includes head 118, which is larger than the hole extending through tank wall 100 in which mechanical fastener 116 is placed. Thus, mechanical fastener 116 can be secured in place by tank wall 100 and attached to internal support 114.

Internal supports 114 provide support to tank wall 100 and prevent excessive bending of the flat walls due to internal or external forces. FIGS. 6A-6C represent three ways of attaching internal supports 114 to tank wall 100 comprising sandwich structure 102.

Figure 7A:
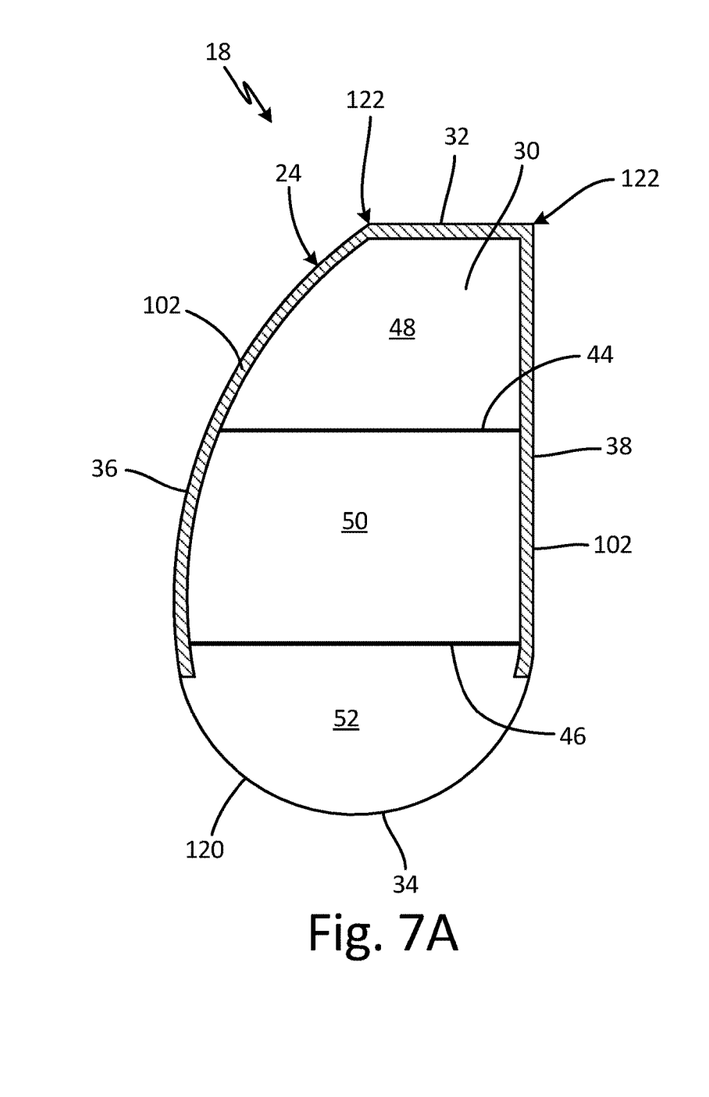
FIG. 7A is a cross-sectional view of a first embodiment of a conformable tank having a sandwich structure.
Figure 7B:
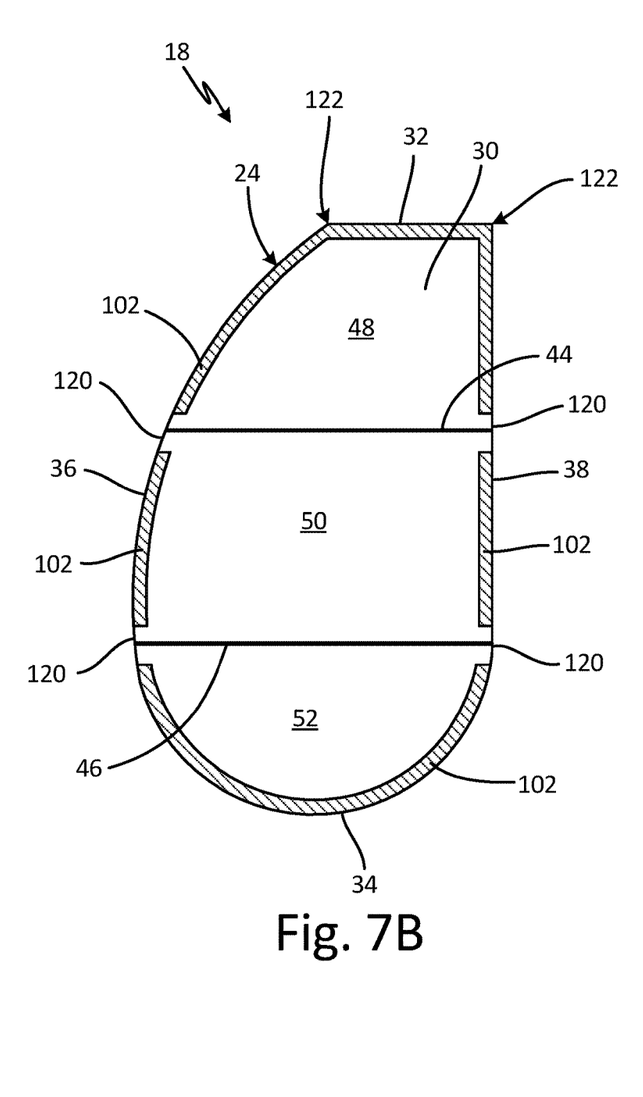
FIG. 7B is a cross-sectional view of a second embodiment of a conformable tank having a sandwich structure.

FIG. 7A is a cross-sectional view of a first embodiment of conformable tank 18 having sandwich structure 102. FIG. 7B is a cross-sectional view of a second embodiment of conformable tank 18 having sandwich structure 102. Conformable tank 18 includes body 24. Body 24 includes front wall 28 (shown in FIG. 2), rear wall 30, top wall 32, bottom wall 34, curved side wall 36, and flat side wall 38. Conformable tank 18 further includes first baffle 44, second baffle 46, first cavity 48, second cavity 50, third cavity 52, sandwich structure 102, single facing composite structure 120, and corners 122.

As shown in FIGS. 7A-7B, conformable tank 18 includes body 24. Body 24 of conformable tank 18 includes front wall 28 that is positioned opposite of rear wall 30, top wall 32 that is positioned opposite of bottom wall 34, and curved side wall 36 that is positioned opposite of flat side wall 38. Conformable tank 18 further includes first baffle 44 and second baffle 46 extending through an interior of conformable tank 18. First baffle 44 extends from curved side wall 36 to flat side wall 38 and from front wall 28 to rear wall 30. Second baffle 46 extends from inner surface 40E of curved side wall 36 to inner surface 40F of flat side wall 38. Second baffle 46 also extends from inner surface 40A of front wall 28 to inner surface 40B of rear wall 30.

Conformable tank 18 has areas with sandwich structure 102 and areas with single facing composite structure 120. Single facing composite structure 120 comprises one facing which may be thermoplastic, fiberglass, carbon fiber reinforced plastic, Kevlar, aramid, or any combination thereof. Single composite facing structure 120 is thinner and lighter than sandwich structure 102. Conformable tank 18 also includes corners 122. Corners 122 can include any corners where any of front wall 28, rear wall 30, top wall 32, bottom wall 34, curved side wall 36, and flat side wall 38 meet one another. Sandwich structure 102 can be positioned in corners 122. It is possible that corners 122 include minimal or no core 108 (shown in FIG. 5) of sandwich structure 102. This reduces the local flexural rigidity of corners 122 and reduces the local compressive stress on interior facing 104 and exterior facing 106.

In FIG. 7A, front wall 28 (not shown in FIG. 7A), rear wall 30, top wall 32, curved side wall 36, and flat side wall 38 are made out of sandwich structure 102. Bottom wall 34 is made out of single facing composite structure 120. Bottom wall 34 is rounded and is an area where compressive stresses are low enough that added support from sandwich structure 102 is not required to meet design specifications of conformable tank 18. Bottom wall 34 incurs lower bending stresses relative to the curved side wall 36 and flat side wall 38 of conformable tank 18. Thus, single facing composite structure 120 may be used to reduce the overall weight of conformable tank 18 while still meeting required operating, proof, and burst pressures of conformable tank 18.

In FIG. 7B, front wall 28 (not shown in FIG. 7A), rear wall 30, top wall 32, bottom wall 34, curved side wall 36, and flat side wall 38 all mostly made out of sandwich structure 102. In the areas where first baffle 44 and second baffle 46 connect to front wall 28, rear wall 30, curved side wall 36, and flat side wall 38, conformable tank 18 is made out of single facing composite structure 120. Front wall 28, rear wall 30, curved side wall 36, and flat side wall 38 include sandwich structure 102 positioned between the areas where first baffle 44 and second baffle 46 connect to front wall 28, rear wall 30, curved side wall 36, and flat side wall 38.

As seen in FIGS. 7A-7B, conformable tank 18 can have sandwich structure 102 located in first sections and single facing composite structure 120 located in second sections. FIGS. 7A-7B are two embodiments of conformable tank 18, however in alternate embodiments conformable tank 18 can have first sections with sandwich structure 102 and second sections with single facing composite structure 120 located in any areas of conformable tank 18.

It is advantageous to reduce the amount of sandwich structure 102 used in conformable tank 18, because sandwich structure 102 is heavier and thicker than single composite facing structure 120. Sandwich structure 102 is used for added strength and stiffness. Single facing composite structure 120 is used where increased strength and stiffness is less desirable relative to flat areas of conformable tank 18. Thus, the overall weight of conformable tank 18 may be reduced by utilizing single facing composite structure 120 while still meeting required operating, proof, and burst pressures of conformable tank 18.

DISCUSSION OF POSSIBLE EMBODIMENTS

The following are non-exclusive descriptions of possible embodiments of the present invention.

A conformable tank includes a body with a plurality of composite walls formed around a cavity, and an internal support connected to one of the plurality of composite walls and positioned in the cavity. The plurality of composite walls includes a flat side wall disposed opposite a curved side wall. A first section of one of the plurality of composite walls includes an exterior facing, an interior facing, and a core positioned between the exterior facing and the interior facing.

The conformable tank of the preceding paragraph can optionally include, additionally and/or alternatively, any one or more of the following features, configurations and/or additional components:

Wherein the plurality of composite walls includes a top wall connected to the curved side wall and the flat side wall; a bottom wall connected to the curved side wall and the flat side wall; a front wall connected to the curved side wall, the top wall, the flat side wall, and the bottom wall; and a rear wall connected to the curved side wall, the top wall, the flat side wall, and the bottom wall.

Wherein the first section of one of the plurality of composite walls is a first section of the flat side wall.

Wherein a second section of the flat side wall includes a single facing composite structure.

Wherein the bottom wall comprises a single facing composite structure.

Wherein the internal support is a baffle.

Wherein the baffle extends through the interior facing and the core of the first section of one of the plurality of composite walls and is integrally formed with the exterior facing.

Wherein the baffle is connected to the first section of one of the plurality of composite walls by a mechanical fastener that extends through the exterior facing, the core, and the interior facing of the first section of one of the plurality of composite walls.

Wherein the internal support is a rib.

Wherein the rib extends through the interior facing and the core of the first section of one of the plurality of composite walls and is integrally formed with the exterior facing.

Wherein the rib is connected to the first section of one of the plurality of composite walls by a mechanical fastener that extends through the exterior facing, the core, and the interior facing of the first section of one of the plurality of composite walls.

Wherein the core is selected from the group consisting of honeycomb, foam, or any combination thereof.

A potable water system for an aircraft includes a conformable tank positioned adjacent to a fuselage of the aircraft that is configured to hold potable water, a fluid flow inducer connected to the conformable tank that is configured to pump water through the potable water system, and a control valve connected to the fluid flow inducer and the conformable tank that is configured to control the flow of water. The conformable tank includes a body with a plurality of composite walls formed around a cavity, and an internal support connected to one of the plurality of composite walls and positioned in the cavity. A first section of one of the plurality of composite walls includes an exterior facing, an interior facing, and a core positioned between the exterior facing and the interior facing.

The potable water system of the preceding paragraph can optionally include, additionally and/or alternatively, any one or more of the following features, configurations and/or additional components:

Wherein the body of the conformable tank includes a second section of one of the plurality of composite walls includes a single facing composite structure.

Wherein the second section of one of the plurality of composite walls is connected to the internal support.

Wherein the internal support extends through the interior facing and the core of the first section of one of the plurality of composite walls and is integrally formed with the exterior facing.

Wherein the internal support is connected to the first section of one of the plurality of composite walls by a mechanical fastener that extends through the exterior facing, the core, and the interior facing of the first section of one of the plurality of composite walls.

Wherein the core is selected from the group consisting of honeycomb, foam, or any combination thereof.

Wherein the internal support is a baffle or a rib.

Wherein the fluid flow inducer is a hydraulic pump or a compressed air system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A conformable tank, comprising:
   a body with a plurality of exterior composite walls formed around a cavity, wherein the plurality of exterior composite walls includes a flat side wall disposed opposite a curved side wall; and
   an internal support integrally formed with one of the plurality of exterior composite walls and positioned in the cavity;
   wherein a first section of one of the plurality of exterior composite walls includes an exterior facing, an interior facing, and a core positioned between the exterior facing and the interior facing, and wherein the internal support is integrally formed with the exterior facing.

2. The conformable tank of claim 1, wherein the plurality of exterior composite walls further includes:
   a top wall connected to the curved side wall and the flat side wall;
   a bottom wall connected to the curved side wall and the flat side wall;
   a front wall connected to the curved side wall, the top wall, the flat side wall, and the bottom wall; and
   a rear wall connected to the curved side wall, the top wall, the flat side wall, and the bottom wall.

3. The conformable tank of claim 2, wherein the first section of one of the plurality of exterior composite walls is a first section of the flat side wall.

4. The conformable tank of claim 2, wherein the bottom wall comprises a single facing composite structure.

5. The conformable tank of claim 1, wherein the internal support is a baffle.

6. The conformable tank of claim 5, wherein the baffle extends through the interior facing and the core of the first section of one of the plurality of exterior composite walls.

7. The conformable tank of claim 1, wherein the internal support is a rib.

8. The conformable tank of claim 7, wherein the rib extends through the interior facing and the core of the first section of one of the plurality of exterior composite walls.

9. The conformable tank of claim 1, wherein the core is selected from the group consisting of honeycomb, foam, or any combination thereof.

10. A potable water system for an aircraft, wherein the potable water system comprises:
the conformable tank of claim 1 positioned adjacent to a fuselage of the aircraft,
a fluid flow inducer connected to the conformable tank that is configured to pump water through the potable water system; and
a control valve connected to the fluid flow inducer and the conformable tank that is configured to control the flow of water.

11. The potable water system of claim 10, wherein the body of the conformable tank further comprises:
a second section of one of the plurality of exterior composite walls which includes a single facing composite structure.

12. The potable water system of claim 10, wherein the internal support extends through the interior facing and the core of the first section of one of the plurality of exterior composite walls.

13. The potable water system of claim 10, wherein the core is selected from the group consisting of honeycomb, foam, or any combination thereof.

14. The potable water system of claim 10, wherein the internal support is a baffle or a rib.

15. The potable water system of claim 10, wherein the fluid flow inducer is a hydraulic pump or a compressed air system.

* * * * *